(12) United States Patent
Pasternak

(10) Patent No.: US 7,772,540 B2
(45) Date of Patent: Aug. 10, 2010

(54) RF CONTROLLED SEQUENTIAL LIGHTING SYSTEM

(76) Inventor: Barton A. Pasternak, 7900 Hidden La., Elkins Park, PA (US) 19027-1103

( * ) Notice: Subject to any disclaimer, the term of this patent is extended or adjusted under 35 U.S.C. 154(b) by 0 days.

(21) Appl. No.: 12/074,781

(22) Filed: Mar. 6, 2008

(65) Prior Publication Data

US 2008/0224026 A1    Sep. 18, 2008

Related U.S. Application Data

(60) Provisional application No. 60/905,026, filed on Mar. 6, 2007.

(51) Int. Cl.
  *G01J 5/42* (2006.01)
(52) U.S. Cl. .................................. 250/222.1; 250/559.4
(58) Field of Classification Search .............. 250/222.1, 250/559.4
  See application file for complete search history.

(56) References Cited

U.S. PATENT DOCUMENTS 6,990,394 B2 *    1/2006    Pasternak .................. 700/295

* cited by examiner

*Primary Examiner*—Seung C Sohn
(74) *Attorney, Agent, or Firm*—Joseph R. DelMaster, Jr.

(57) ABSTRACT

An RF controlled lighting system that activates lights in adjacent spaces when a person walks into a first space and then traverses the spaces in sequence. A detection device senses the entry of a person into a first space controlled by the system. A micro-controller activates the lights in that space for immediate light and in the adjacent spaces in preparation for the person to traverse the spaces in either direction from the origin space. As the person traverses the contiguous spaces, controllers in each space sense the person's presence and communicate by RF signals to activate lights along the person's path. The controllers extinguish their lights a predetermined time after the person passes or no one enters a space.

10 Claims, 5 Drawing Sheets

RF CONTROLLED SEQUENTIAL LIGHTING SYSTEM

PRIORITY OF THE INVENTION

This application is based on the earlier filing of a provisional application Ser. No. 60/905,026, on Mar. 6, 2007. That provisional application is incorporated herein by reference in its entirety.

FIELD OF THE INVENTION

A lighting system primarily—though not exclusively—for commercial, industrial or educational structures in which large numbers of lights and light fixtures must be activated to provide adequate visibility. The present invention is particularly useful in stairwells, eliminating the need to keep lights illuminated at every level all the time, thus saving energy.

BACKGROUND OF THE INVENTION

In large office, industrial, and school buildings it is often the case that large numbers of lights are kept illuminated for long periods, even when no one is present on a floor or in a stairwell. It is desirable to save both money and energy in the operation of the lighting systems in such structures. One way to accomplish that objective is to permit lights to remain off unless there is a present need for lighting as people use the building. It is well known, for example, to allow a light controller to turn off the lights in rest rooms when no one is using them. A motion sensor detects the entry of a person into the rest room and activates the lights while there is motion within the room. Once motion stops, indicating that the person has left, the lights are allowed to go off again until another person enters. This type of energy conservation is to be encouraged and is, in fact, often rewarded with incentive discounts in their rate structures by the companies providing power to large facilities.

The present invention addresses another way to control costs and energy consumption within a structure, using computer-controlled light controls to light stairways and other areas within the structure only as needed.

SUMMARY OF THE INVENTION

An RF controlled lighting system for automatically controlling lights in adjacent spaces according to detected motion comprising one or more lights in each of a plurality of adjacent spaces, a motion sensor in each of the plurality of adjacent spaces, a light controller in each of the plurality of adjacent spaces for activating and deactivating the lights within each space independent of every other space, an RF communication transceiver associated with each controller to communicate between controllers in adjacent spaces such that motion detected in any space activates lights in that space and any immediately adjacent controlled space not already active. The invention may be applied to other facilities in which persons move from space to contiguous space infrequently such that controlling space lighting is an electrical efficiency measure.

DESCRIPTION OF THE INVENTION

The present invention is a radio-frequency (RF) activated sequential lighting system. The system is designed to activate only the lights necessary to enable persons moving through a part of a facility to have normal lighting wherever they are at a given time. The lighting system senses the movement of the person within the structure and activates lighting in the person's location and adjacent locations as the person moves through areas in the structure. The system extinguishes the lights in areas where the person has either not entered or has vacated. The example described herein addresses a stairwell but it is understood that the system is also adaptable to other areas of a building, including hallways, workbays, storage areas, and the like.

Figure 1:
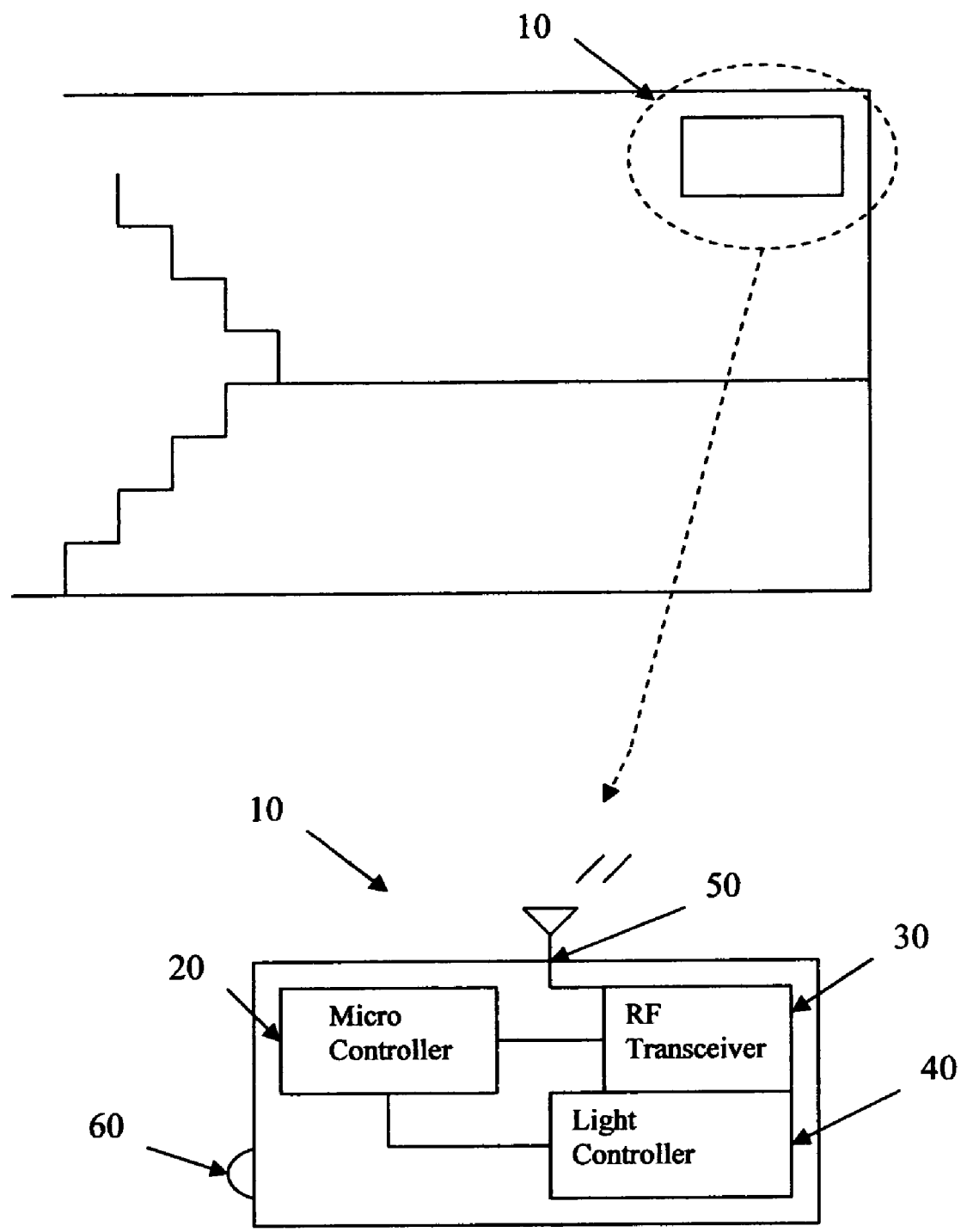
FIG. 1 is a block diagram of a lighting control unit according to the invention.

Referring to FIG. 1, the components of the RF sequential lighting system are a master controller 10 and the lights themselves (not shown). The master controller 10 can be either integrated into one or more light fixtures in an area or can be located at a convenient site within an area and connected electrically to the light fixtures in that area.

The master controller 10 comprises a micro-controller 20, an RF transceiver 30, a light control 40, an antenna 50, and a motion sensor 60. It may be possible in some embodiments to combine the light control 40 with the micro-controller 20. FIG. 1 is provided to show the fundamental functional elements of the master controller 10 that operates the sequential RF lighting system of the invention, not necessarily a schematic diagram of the actual device.

In operation, the motion sensor 60 detects the presence (or entry) of a person in the monitored space. In this description the space is a multi-level stairwell wherein each landing is equipped with a master controller 10 for the local lights on that landing. The motion sensor 60 signals the micro-controller 20 that movement has been detected. The micro-controller 20 immediately signals the light control 40 to turn on the lights for that landing of the stairwell.

Because the entry of a person into a stairwell does not immediately provide data indicating whether the person will ascend or descend the stairs, the controller 20 sends RF signals addressed to the two adjacent stairwell light fixtures (and their associated controllers). The adjacent stairwell lights are activated by the respective controllers on those levels. The system of the invention thus prepares the way for the person entering the stairwell to have light where she enters and to go up or down with lighting ready at the next level.

Figure 2:
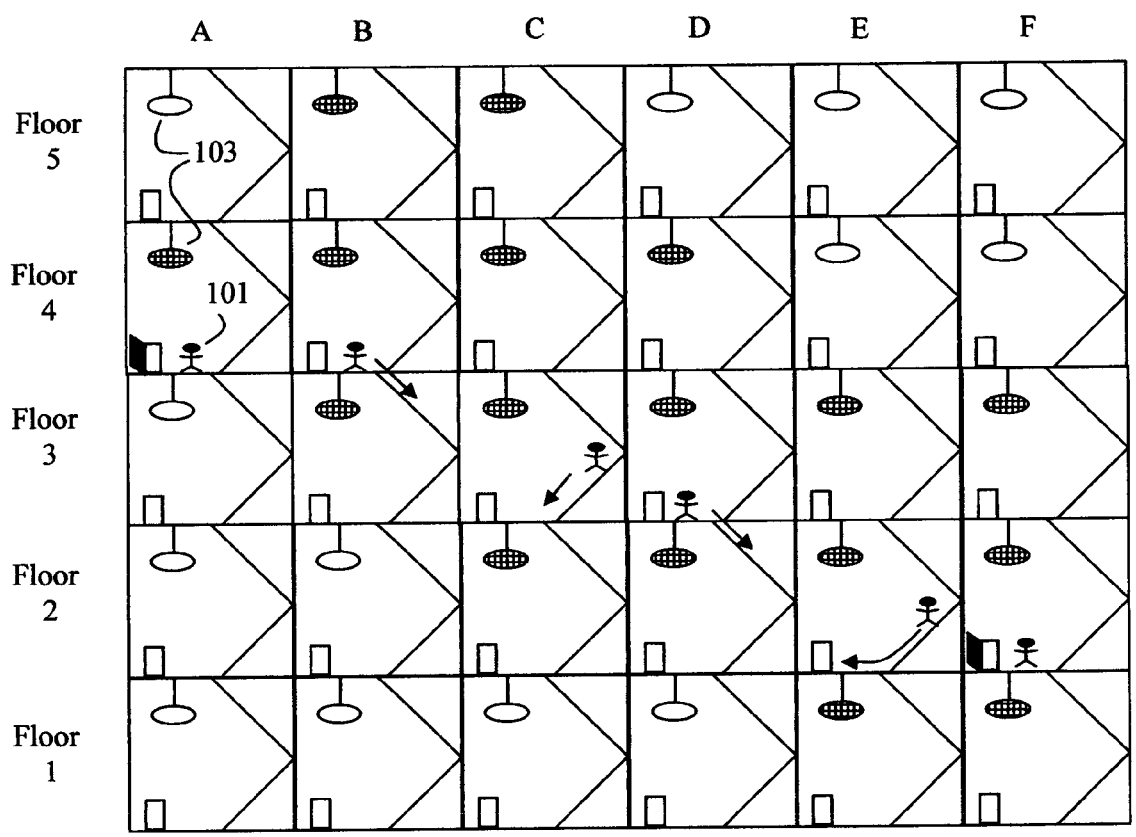
FIG. 2 is a graphic depiction of the operation of the light system of the invention.

Referring to FIG. 2, the operation of the lighting system of the invention is illustrated as a person enters the stairwell and descends two floors. FIG. 2 depicts a stairwell of five (5) floor levels in six sequential conditions (A through E) as a person 101 enters at floor level 4 and moves down. The lights 103 at each stairwell are shown in activated (the hatched area) and non-activated (clear) states.

As the person 101 enters the stairwell at the fourth floor, the lights 103 on the fourth floor level are activated immediately upon detection of the person's presence. See condition A in FIG. 2. Though reference is made here to a motion sensor, any kind of sensor suitable to the task may be employed, such as an ultrasonic sensor, and infrared sensor, a photocell beam in the doorway, or other device that reliably indicates that a person has entered the stairwell.

Once the fourth floor lights are turned on, the controller 20 on the fourth floor sends a signal to the controllers on the adjacent two floors, three and five, to turn on their lights. The successful receipt of that message, and lighting of the lights on levels three and five, is illustrated at B in FIG. 2, where the lights on levels three, four, and five are all indicated to be ON.

At C in FIG. 2 the person 101 descends the stairs to level three, where the lights are already ON. Upon detection of the presence of the person 101 on level three, the controller 20 on that level sends a message to levels two and four to activate their lights. That condition is illustrated at D in FIG. 2, which also shows that the lights at level five have turned OFF after an appropriate timeout period in which no person entered that level.

The person 101 continues to descend toward level two (E in FIG. 2) where she will exit the stairwell. Once detected on level two, the controller 20 there sends a signal to levels three and one to activate their lights while the lights on level four are allowed to timeout. If the person 101 elected to continue down to level one, the lights there are ON and ready. Finally, as indicated at condition F in FIG. 2, the person exits the stairwell at level two. After the person leaves, the remaining lights (levels one, two, three) are allowed to timeout and turn OFF.

Figure 3:
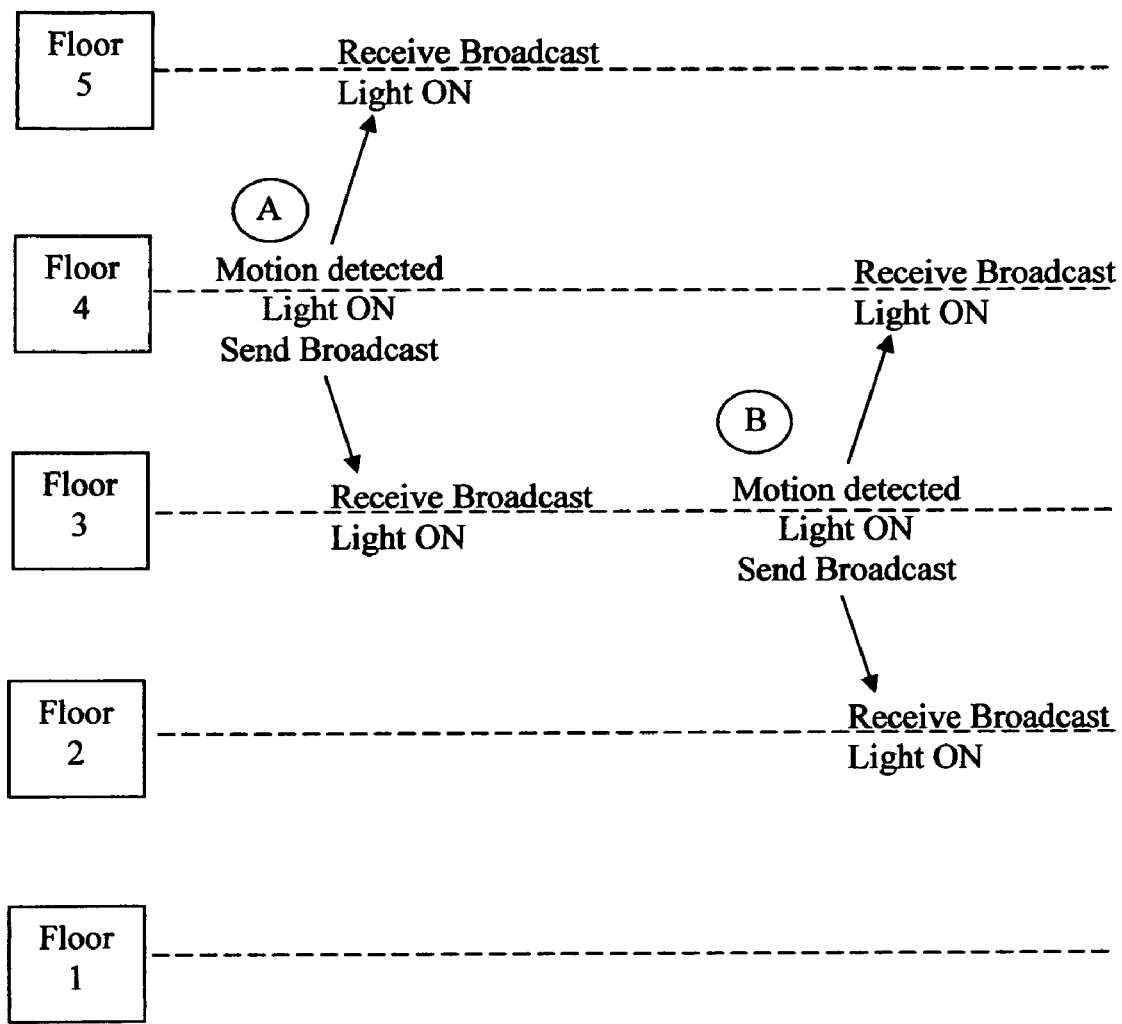
FIG. 3 is a graphic depiction of the operational sequence of the light system of the invention.

FIG. 3 is a partial sequence diagram of the operation of system of the invention as shown in FIG. 2. Upon detection of motion (at A in FIG. 3) on Floor 4, the controller 20 on Floor 4 causes the lights on that level to be turned ON and then broadcasts a message addressed to the two adjacent floors. On Floors 5 and 3, that message is received and each of those floor controllers 20 causes the lights on that level to be turned ON. At that point, the lights on three levels (3, 4, 5) are ON.

FIG. 2 shows that the person in the stairwell then descends to Floor 3 from Floor 4. FIG. 3 indicates that once motion is detected (at B in FIG. 3) on Floor 3, the same set of actions takes place in the controller 20 for Floor 3 as occurred on Floor 4. This results in the lights going ON on Floors 3 and 2, while they remain ON on Floor 4. The lights on Floor 5 are allowed to time out and go OFF.

It can be seen that the application of this system is not limited to stairwells. The sequential RF lighting system may also be used in hallways, large bays, office areas and the like, activating and deactivating lights in predetermined zones within buildings as people move about. Such systems are particularly useful in off-hours when the number of persons in a facility is at a minimum and continuous lighting throughout the structure is unnecessary (and wasteful).

For safety reasons, it may be necessary to turn ON all of the lights in the actively controlled area. This might be true in a fire, for instance. A safety switch can easily be placed in each controlled area (such as on each floor level of a stairwell) that can override the normal operation of the system controllers and turn all of the lights ON until the emergency is over.

Figure 4:
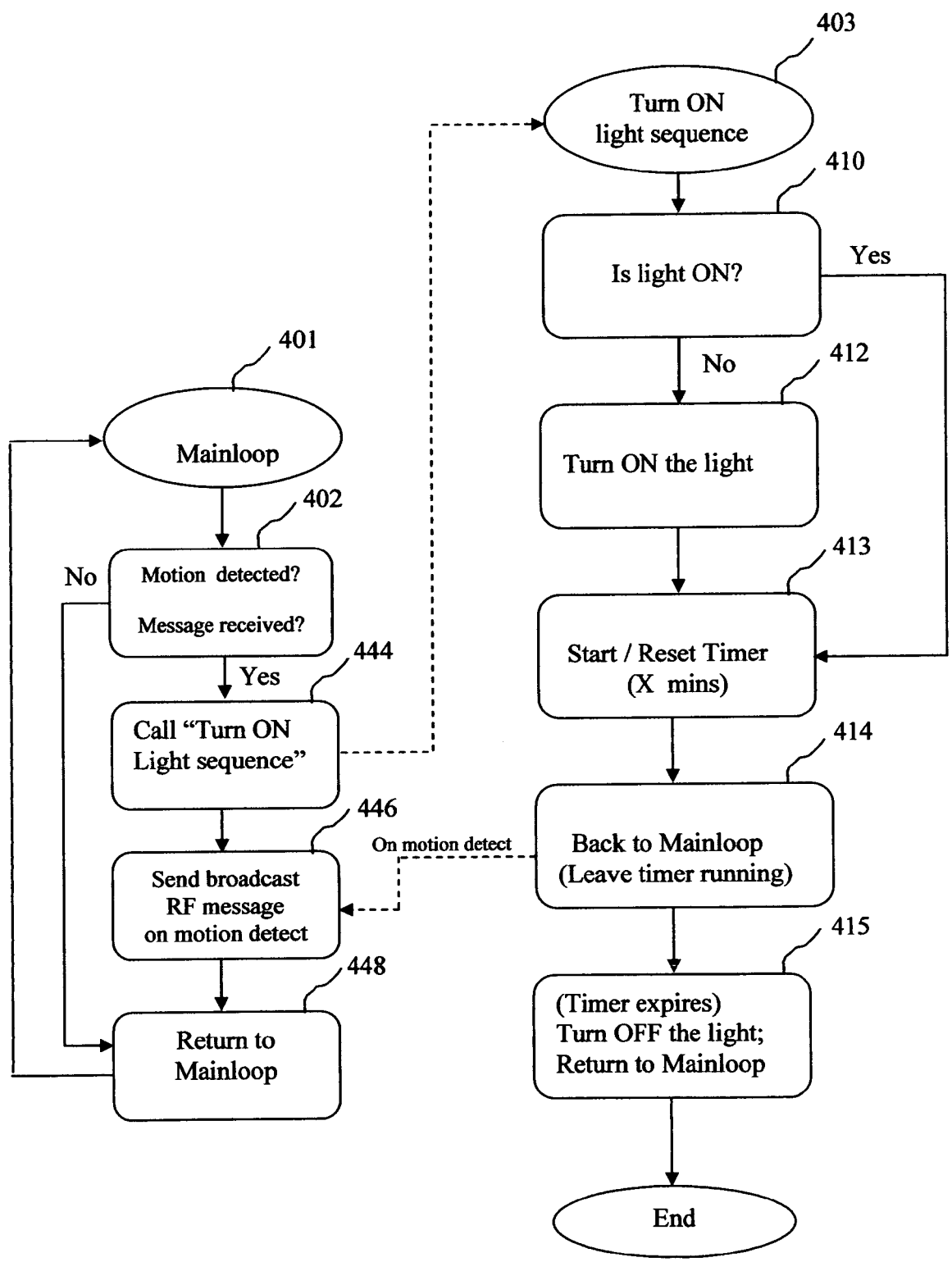
FIG. 4 is a flow diagram of the operation of an exemplary embodiment of the invention.

Certain basic functions are implemented in the RF light system controller 20 to operate it according to the description above. FIG. 4 illustrates by functional diagram how the control process in each controller works. Each controller 20 runs software that contains a Mainloop 401. Because the master controller 10 is dedicated to lighting control in this example, it simply waits for a motion detection signal 402 or a broadcast from an adjacent floor. As long as there is no motion detection (in the stairwell of this example) or a broadcast, the software simply returns to the Mainloop 401 for continued monitoring.

If motion is detected, or a broadcast message directed to the floor is received, then the controller calls 444 a Turn ON Light Sequence 403. That sequence begins at step 410 in FIG. 4 with a check to determine if the lights are already ON. If so, the controller resets a timer 413 that controls how long the lights will be left ON on that floor. If the lights are not ON when the sequence is initiated, then the lights are turned ON 412 and the timer set 413 for the initial time interval to leave them ON. After the timer is set or reset 413, control is returned 414 to the Mainloop 401. The timer remains running in the background 414. If no motion is detected again, or no message received to keep the lights ON, then the timer runs out and the lights are turned OFF 415.

Figure 5:
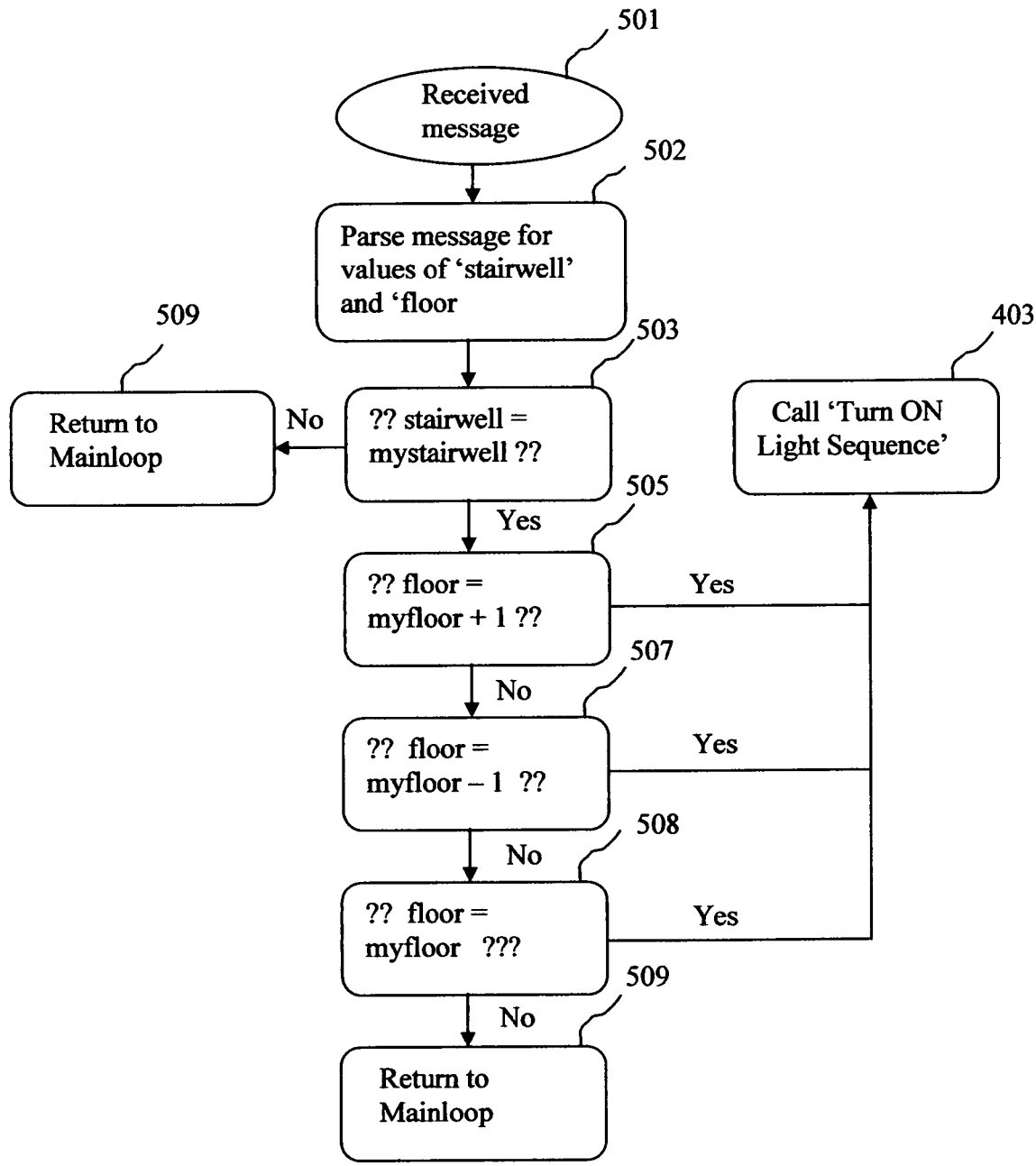
FIG. 5 is a flow diagram of the operation of an exemplary embodiment of the invention.

The RF transceiver 30 in the light controller 10 may be any of several available devices known to persons skilled in the art of remote controllers. It is known that transceivers operating Z-wave communications protocols are often used in remote control applications. In the present invention, it is the process of operating the facility lights sequentially by automated remote commands that distinguishes the invention's communication and control scheme from other remote controlled devices (such as a garage door opener or a single-room remote ON switch responding to a motion sensor). An example of a functional diagram for the control message sent by the light control transceiver, and the action taken in response to that message, is illustrated in FIG. 5.

An RF message received 501 by any controller 10 contains at least an address ('stairwell') so that a receiving controller can determine if the message is intended for action in its stairwell (as opposed to another stairwell in the area). For example, in FIG. 2 the person 101 enters the stairwell on the fourth floor. Assume that this stairwell is designated Stairwell 27 in the building. The controller 10 on that floor sends an RF message into the air. All of the controllers in that stairwell— and in other stairwells in the same building—receive the message. The sending controller sets the value for 'stairwell' in the message to be 27. When the receiving controllers receive the message all over the building and parse it for contents 502, only the individual light controls in stairwell 27 take any action because the value of 'stairwell' in the message 503 is the same as the value 'my stairwell' stored in memory. The other stairwell controllers ignore the remainder of the message.

The light controllers 10 on stairwell 27 continue to process the message to determine which controller has to execute an action. Each controller has a permanently stored value (here 'myfloor') indicating the floor on which it is located. From the description above, it is known that the detection of motion on any floor triggers the lights on that floor and the one floor above and below to be turned ON.

The sending controller includes a value for 'floor' in the message, indicating the floor on which the message originated. The receiving controllers (all of those is stairwell 27 in this example) find the value 'floor' in the message, then determine whether it is either the floor above 505, the floor below 507, or the same floor 508 where the message originated. If the message meets any of these three criteria, then the process invokes the TURN ON sequence 403 (FIG. 4) for that controller. If 'myfloor' is more than one floor away from the originating floor ('floor'), then no action is necessary and the controller returns to the main loop 509.

The illustrations in the FIGS. (3 through 5) are not intended to be absolute but are examples only. They are functional illustrations, not literal software design and are not intended to limit the scope of the invention in any way. This description is also not intended to limit the scope of the invention. It is an explanation of the invention, which can be implemented in several embodiments without departing from the fundamental concept of the invention. Reference should be made to the following claims that define the scope of the invention.

I claim:

1. A sequential lighting control system controlled by radio frequency (RF) signals, comprising:

a motion sensor, a light controller and associated lights located on each level of a stairwell for detecting the presence of one or more persons in the stairwell and sequentially lighting individual levels of said stairwell when needed; wherein a first motion sensor that detects the entry of a person into a first level of a stairwell sends an RF signal to a first RF receiver in a first light controller that controls lights in that level of said stairwell, said controller activating said lights in response to said RF signal;

said first light controller transmits an RF signal to light controllers on immediately adjacent levels of said stairwell, which light controllers upon receiving said signal activate lights on the immediately adjacent levels of said stairwell;

said adjacent level motion sensor detects movement of one or more persons ascending or descending the stairwell and signals the respective light controller on the next adjacent level such that the controller at that level signals controllers on further adjacent levels to activate their respective lights, such that lights in the stairwell are activated in sequential manner until the one or more persons exit the stairwell.

2. The sequential lighting control system of claim 1, wherein all of the RF signal transmission and reception is accomplished by wireless means.

3. The sequential lighting control system of claim 1, wherein the lights on each respective level of said stairwell are independently deactivated by the respective level light controller when no motion signal from the motion sensor at that level is received by the light controller on said level for a predetermined period of time.

4. A sequential lighting control system comprising:

a first transceiver in a first controller communicating with a first light that receives a first activation signal to activate said first light, commands activation of said first light, and transmits a second activation signal to a second transceiver in a second controller to activate a second light;

said second transceiver communicating with a second light and receives the second activation signal to activate said second light, commands activation of said second light, and transmits a third activation signal to activate a third light;

said third transceiver communicating with a third light and receives the third activation signal and commands activation of a third light.

5. The sequential lighting control system of claim 4 wherein, the activation signals are wireless RF signals.

6. The sequential lighting system of claim 4, further comprising a motion sensor located within a space, wherein the first activation signal originates from a triggering of the motion sensor upon detection of a presence of one or more persons in the space.

7. The sequential lighting system of claim 6 wherein said motion sensor sends said first activation signal to said first transceiver in communication with said first light.

8. The sequential lighting system of claim 7, wherein said first, second and third transceivers are combined with respective computer controllers that send activation and deactivation commands to said respective first, second and third lights.

9. The sequential lighting system of claim 8, wherein lights in sequential adjacent spaces are activated as said one or more persons move through said spaces and whose movements are detected by motion sensors in said sequential spaces.

10. The sequential lighting system of claim 9, wherein lights in each respective space are deactivated by the controller in said respective space when no motion signal from the motion sensor in said respective space is received by the light controller in that space for a predetermined period of time.

* * * * *